(12) United States Patent
Kennedy

(10) Patent No.: US 7,452,156 B2
(45) Date of Patent: Nov. 18, 2008

(54) COMPOSITE STRUCTURAL MEMBER AND METHOD FOR MAKING THE SAME

(75) Inventor: Dennis K. Kennedy, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 20 days.

(21) Appl. No.: 11/561,099

(22) Filed: Nov. 17, 2006

(65) Prior Publication Data

US 2008/0119296 A1    May 22, 2008

(51) Int. Cl.
*F16B 7/00*    (2006.01)
(52) U.S. Cl. ..................... 403/293; 403/309
(58) Field of Classification Search .............. 403/274, 403/276, 278–282, 285, 286, 293, 298, 308–315; 156/293; 29/525, 469.5, 516, 517; 285/242, 285/243, 256, 259; 464/179–183
See application file for complete search history.

(56) References Cited

U.S. PATENT DOCUMENTS

| | | | | |
|---|---|---|---|---|
| 2,741,498 A * | 4/1956 | Elliott | ................... | 285/148.11 |
| 3,881,973 A * | 5/1975 | Pinckney | ................... | 156/293 |
| 4,236,386 A * | 12/1980 | Yates et al. | ................... | 156/172 |
| 4,238,540 A * | 12/1980 | Yates et al. | ................... | 156/172 |
| 4,260,332 A * | 4/1981 | Weingart et al. | ............ | 416/226 |
| 4,426,761 A * | 1/1984 | Sassak | ..................... | 285/381.1 |
| 4,704,918 A * | 11/1987 | Orkin et al. | ................. | 464/181 |
| 4,851,065 A * | 7/1989 | Curtz | ........................ | 156/172 |
| 6,379,763 B1 * | 4/2002 | Fillman | ..................... | 428/36.9 |

* cited by examiner

*Primary Examiner*—Victor MacArthur
(74) *Attorney, Agent, or Firm*—Alston & Bird LLP

(57) ABSTRACT

Composite structural members are provided including a fitting and a tubular shaft. The fitting has a coupling region defining at least one recessed portion bounded by one or more non-recessed portions. The recessed portion may extend circumferentially around the fitting to form a neck. The tubular shaft has a mating region and defines a lumen in which the fitting is disposed. The mating region of the shaft mates with the coupling region of the fitting to create interference between the shaft and fitting. Adhesive may be disposed between the mating region of the fitting and the coupling region of the shaft. The mating region of the shaft may be partially and proximately surrounded by a reinforcing member, and a sleeve may be coupled substantially concentrically to the shaft for discouraging separation of the reinforcing member and the mating region of the shaft. In some cases, adhesive is disposed between the reinforcing member and sleeve.

19 Claims, 10 Drawing Sheets

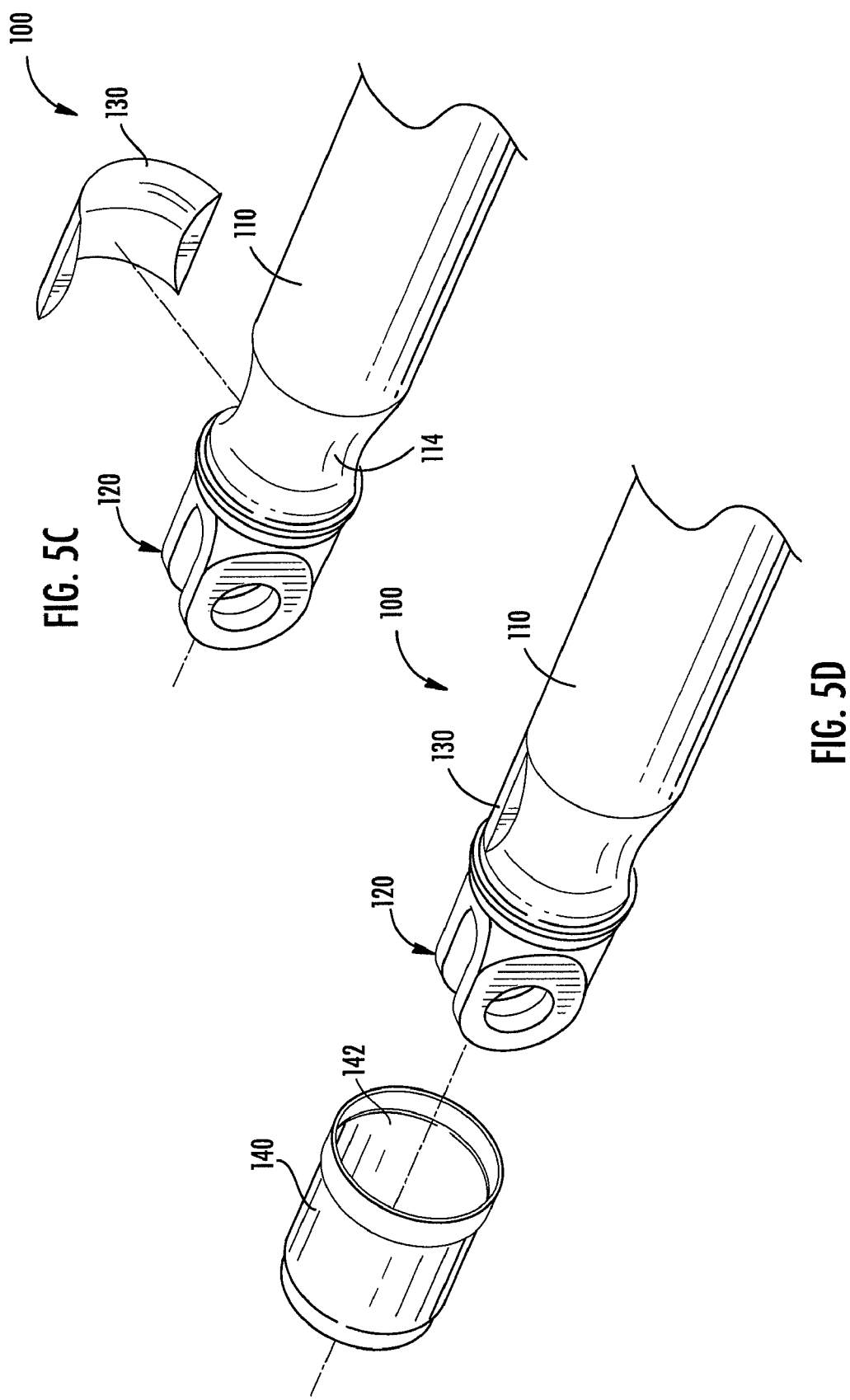

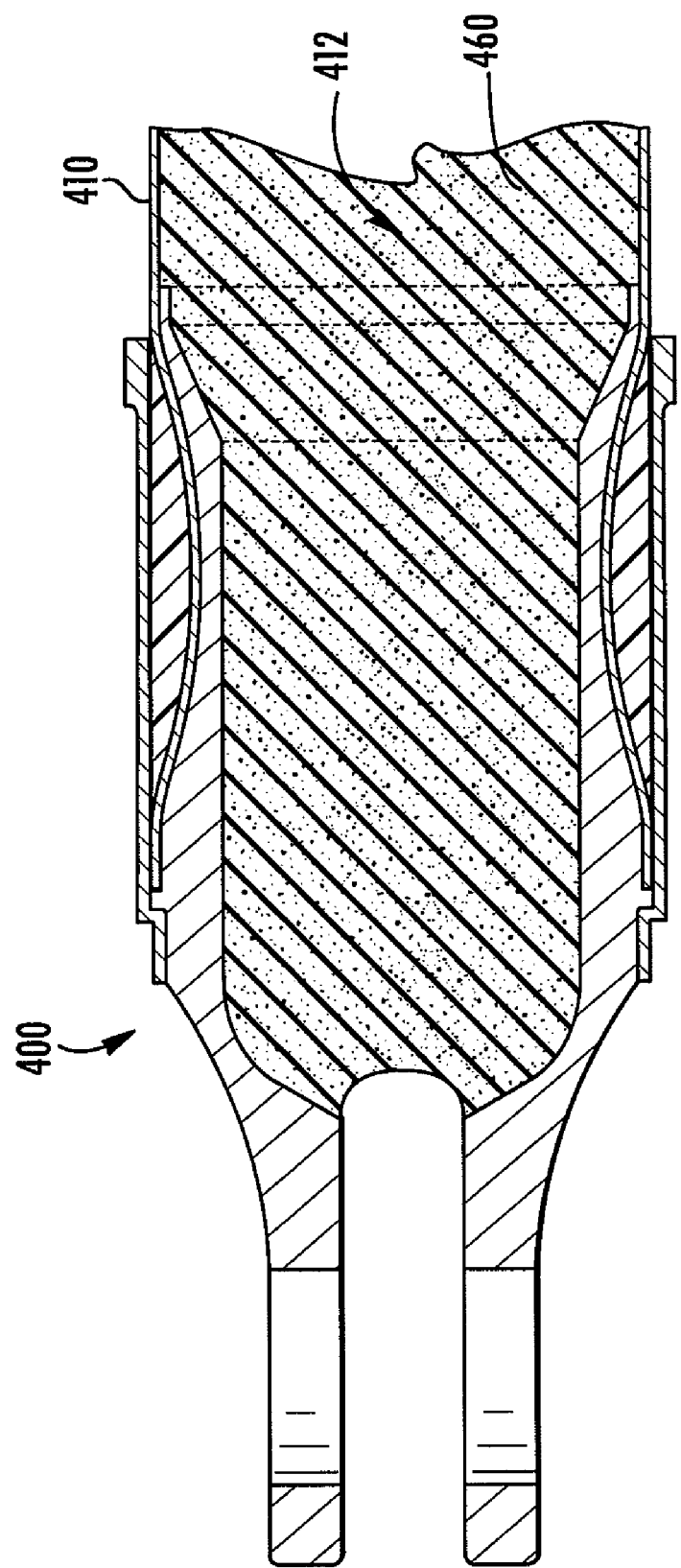

COMPOSITE STRUCTURAL MEMBER AND METHOD FOR MAKING THE SAME

FIELD OF THE INVENTION

Embodiments of the invention are directed to composite structural members and a method for making the same, and more particularly to composite structural members including parts that interfere with one another.

BACKGROUND OF THE INVENTION

Traditionally, commercial airplanes were constructed with structural components composed mainly of aluminum. Such structural components exhibited significant strength and resistance to degradation at elevated temperatures, and were therefore desirable. In more recent times, commercial airplanes in increasing numbers are being designed and constructed so as to incorporate composite structural components, meaning these components incorporate elements of metal and elements composed of other materials. One of the most common classes of non-metallic material to be used in aircraft construction is polymer-based materials. These materials are relatively lightweight and easily (and, therefore, inexpensively) formed into complex geometries, and as such, designers are using those materials in increasing amounts. This becomes increasingly evident as new reinforcement methods for resin-based materials, including new reinforcement schemes in fiber-reinforced resin materials, are developed, thereby increasing the strength of the overall composite material. Still, some components are required to withstand large forces or temperatures, and for these, aluminum or another metal is usually preferred.

More recently, the aerospace industry has begun to utilize components that contain both metallic and resin-based elements assembled into one integrated part. This practice utilizes the advantageous features of both classes of materials by combining targeted use of metal elements in strength-critical areas with supplemental use of structurally efficient resin-based materials in other areas. However, the integration of metallic and resin parts involves several challenges. One of the most prominent is maintaining the integrity of the bond between the metal and resin parts. In many cases, such composite parts are bonded using an adhesive, such as epoxy. Residual stresses present in joints between the metal and resin parts, due to the large mismatch of thermal expansion coefficients that often exists between metals and resins, can be great enough to cause de-bonding of the metal and resin elements. Further, the areas where different parts are fastened together often include stress concentrations that can lead to failure. Finally, the adhesive strength between the epoxy and the adjacent parts, as well as the cohesive strength of the epoxy itself, can be reduced when compared to the strength of the component parts. For all of these reasons, failure of composite structural members due to failure of the joints between the metal and resin-based components is a significant issue, and there is a need in the art for an improved method for creating composite structural components in which the integrity of the coupling between the elements of the composite structural component is enhanced.

SUMMARY OF THE INVENTION

Embodiments of the invention may address at least some of the above disadvantages and achieve still other advantages by providing a composite structural member and a method for making the same. In this regard, the composite structural member includes a fitting coupled with a shaft, the fitting having a recess. The shaft is configured such that the recess in the fitting leads to mechanical interference between the fitting and shaft, thereby inhibiting some relative movements of the shaft and fitting.

In one embodiment, a composite structural member includes a fitting and a tubular shaft. The fitting has a coupling region defining at least one recessed portion bounded by one or more non-recessed portions. The recessed portion may extend circumferentially around the fitting to form a neck. The tubular shaft has a mating region and defines a lumen in which the fitting is disposed. The mating region of the shaft mates with the coupling region of the fitting to create interference between the shaft and fitting. In some embodiments, adhesive may be disposed between the mating region of the fitting and the coupling region of the shaft. The mating region of the shaft may be partially and proximately surrounded by a reinforcing member, and a sleeve may be coupled substantially concentrically to the shaft for discouraging separation of the reinforcing member and the mating region of the shaft. In some cases, adhesive is disposed between the reinforcing member and sleeve.

In some embodiments, the shaft, fitting, reinforcing member, and sleeve may be tapered. In other embodiments, the sleeve may be compressed around either or both of the shaft and fitting. In still other embodiments, a core may be disposed in at least part of the lumen of the shaft for supporting at least part, or possibly all, of the shaft.

Another embodiment of the present invention is directed to a composite structural member. The member includes a fitting having a coupling region with an outer surface defining at least one recessed portion bounded by one or more non-recessed portions. A tubular shaft has a mating region that is radially adjacent to the coupling region, the mating region defining a recess that mates with the recessed portion of the outer surface. At least one reinforcing member partially and proximately surrounds the mating region of the shaft. A tubular sleeve is substantially concentric with the shaft and radially adjacent to the reinforcing member, and as such, the shaft and fitting are mechanically restrained from at least some relative movement and the sleeve discourages separation of the reinforcing member and the mating region of the shaft.

Yet another embodiment of the present invention is directed to a method for producing a composite structural member. The method includes providing a fitting having a coupling region. The coupling region has an outer surface that defines at least one recessed portion bounded by one or more non-recessed portions. A shaft is formed around the fitting such that a mating region of the shaft is radially adjacent to the coupling region and mating with the recessed portion of the outer surface.

BRIEF DESCRIPTION OF THE DRAWINGS

Figure 1:
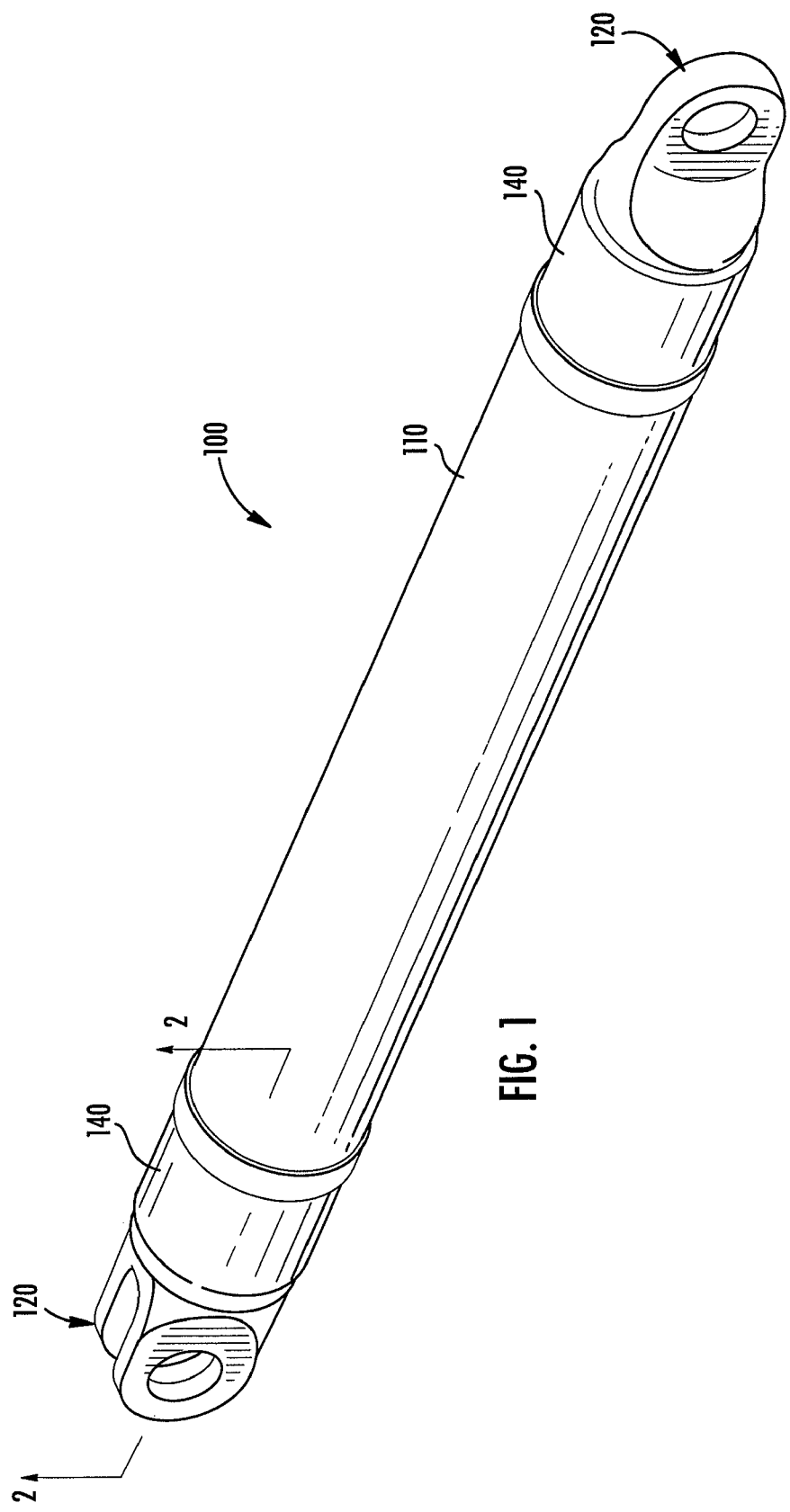
Figure 2:
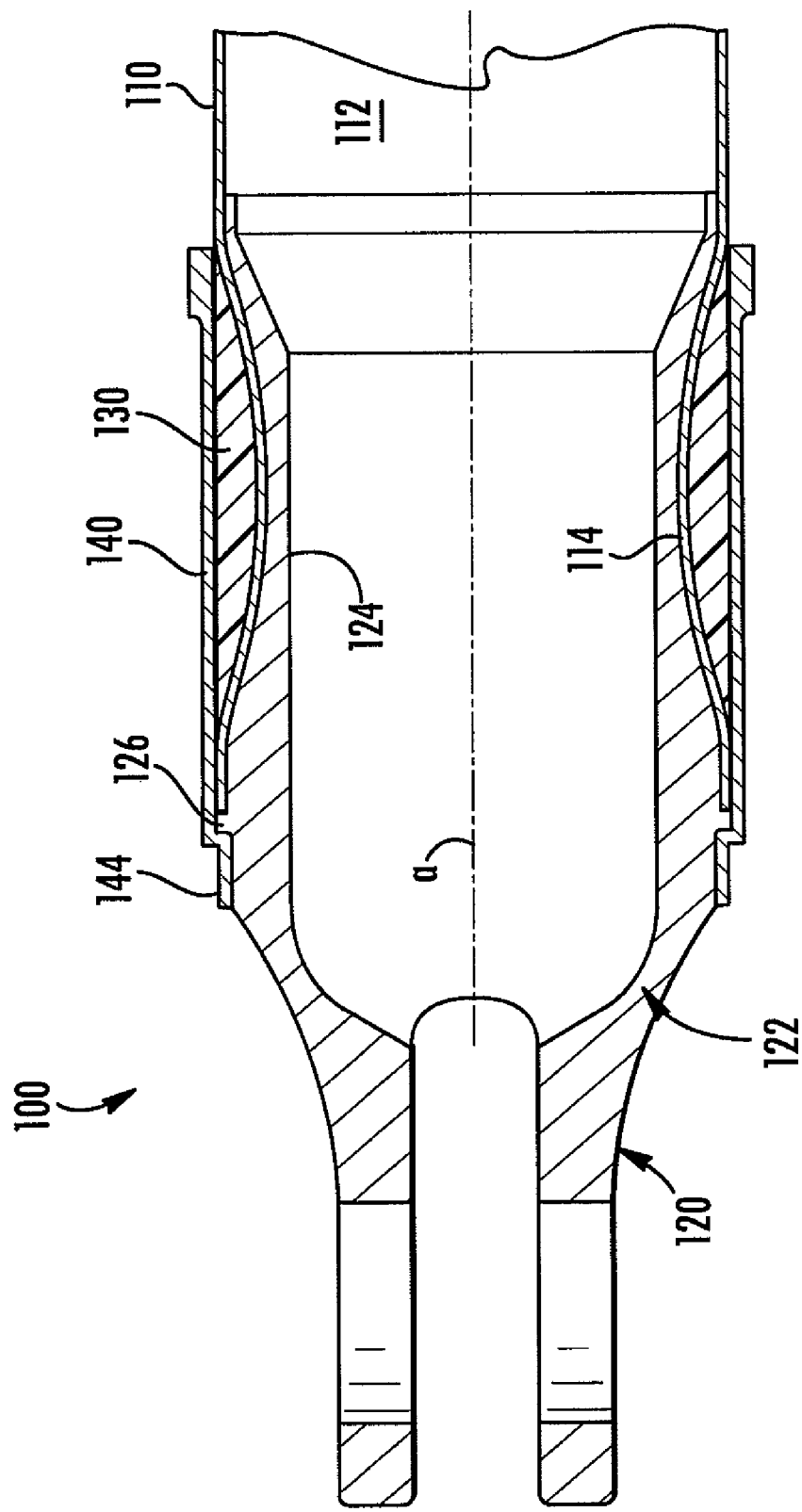
Figure 3:
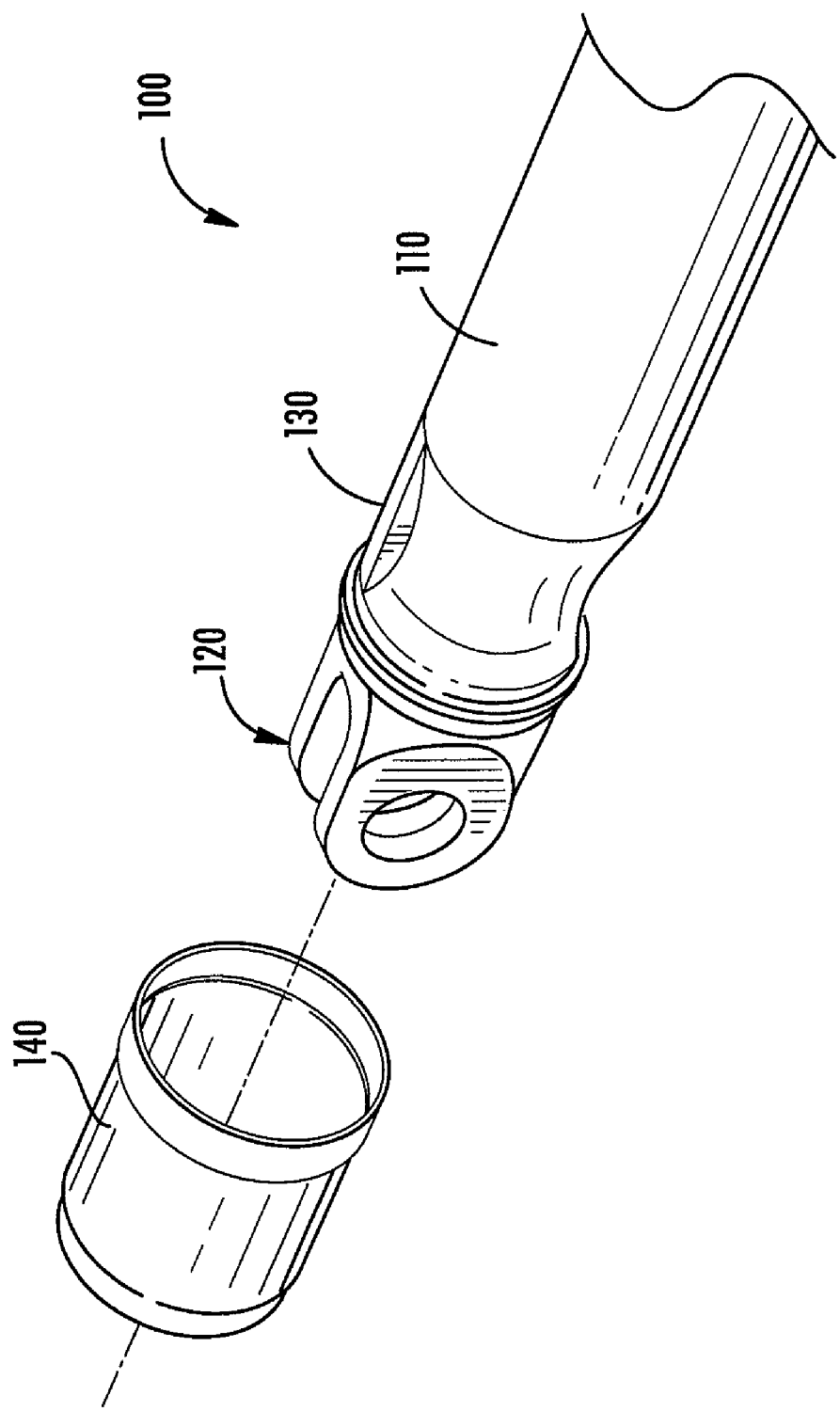
Figure 4:
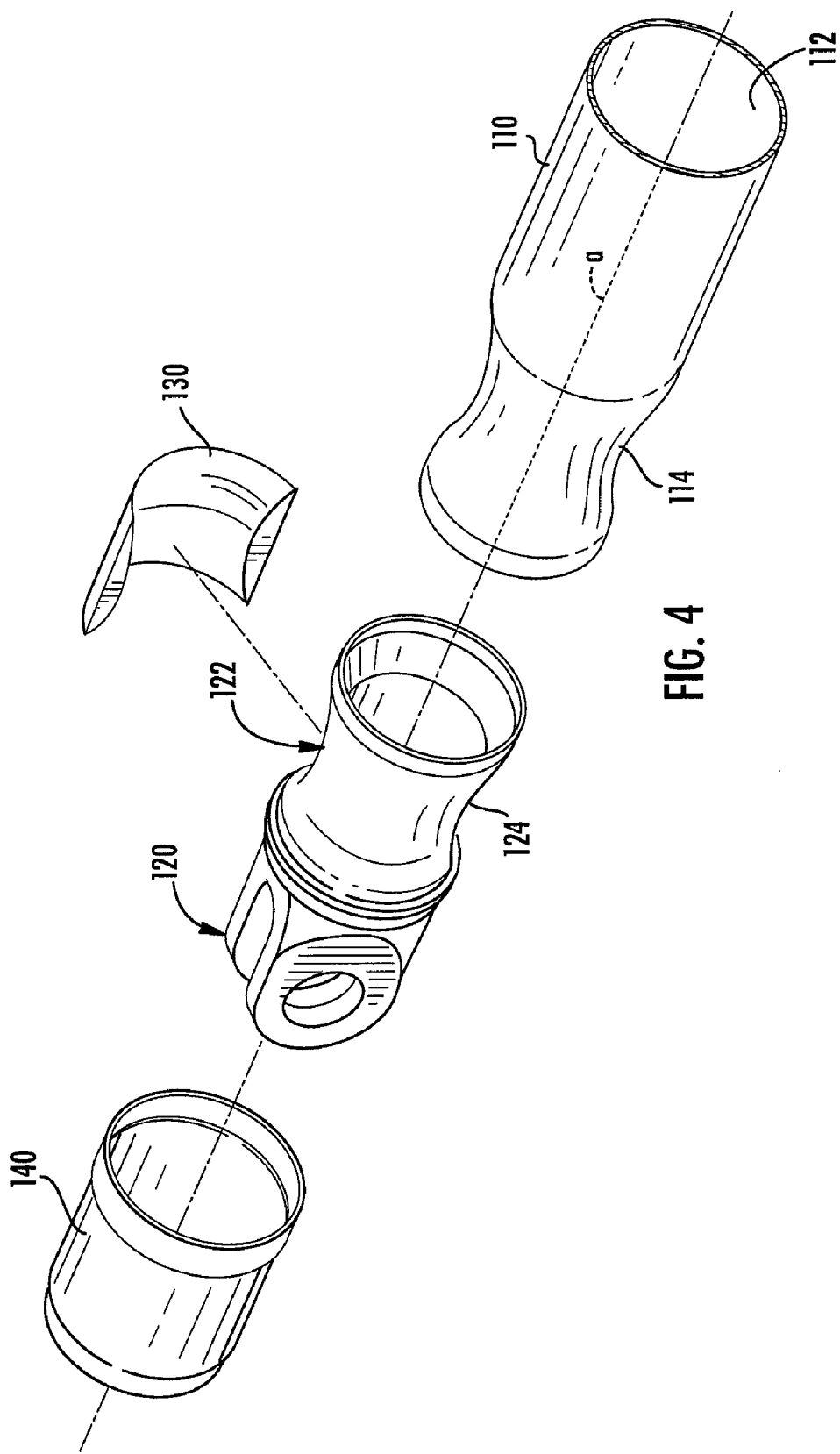
Figure 5A:
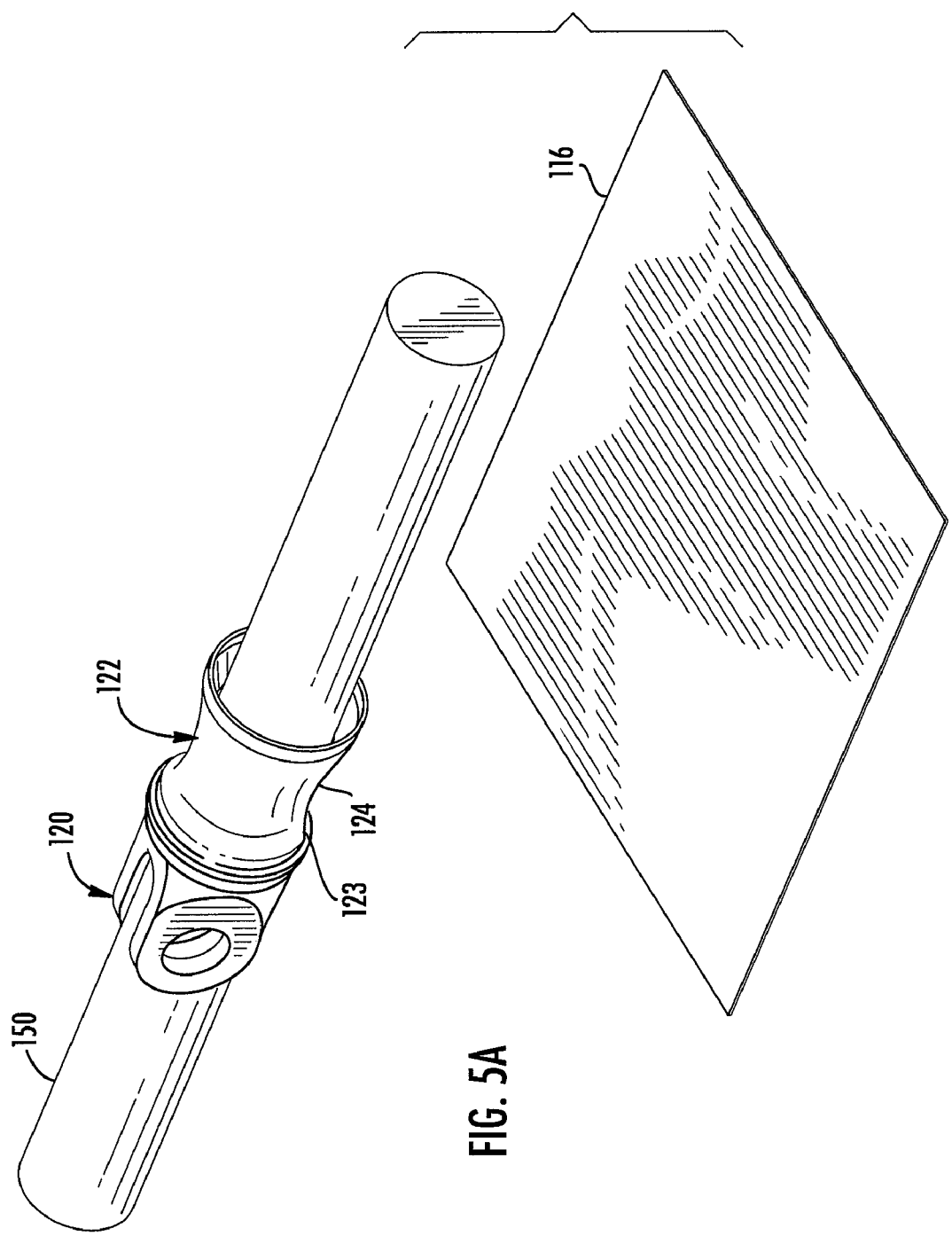
Figure 5B:
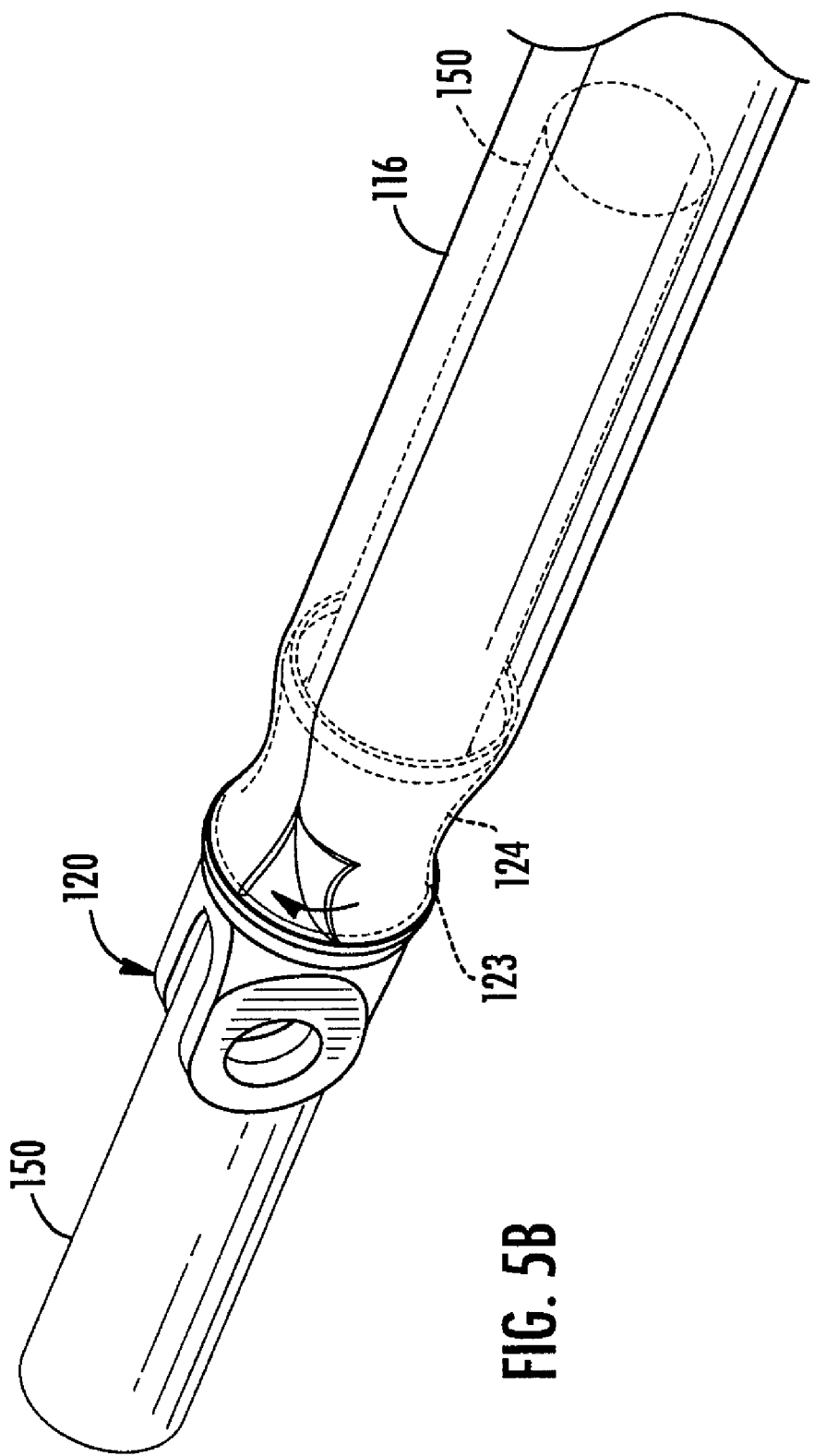
Figure 6:
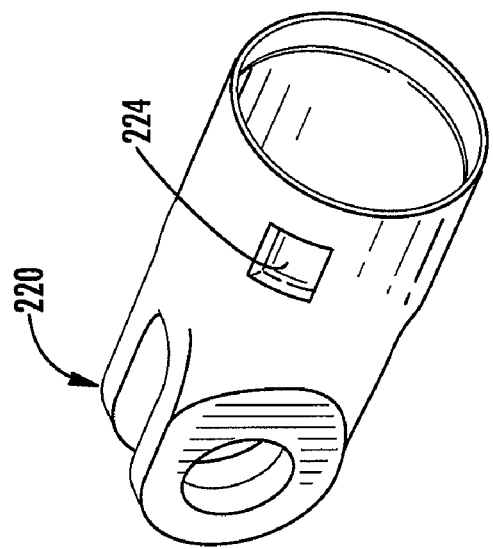
Figure 7:
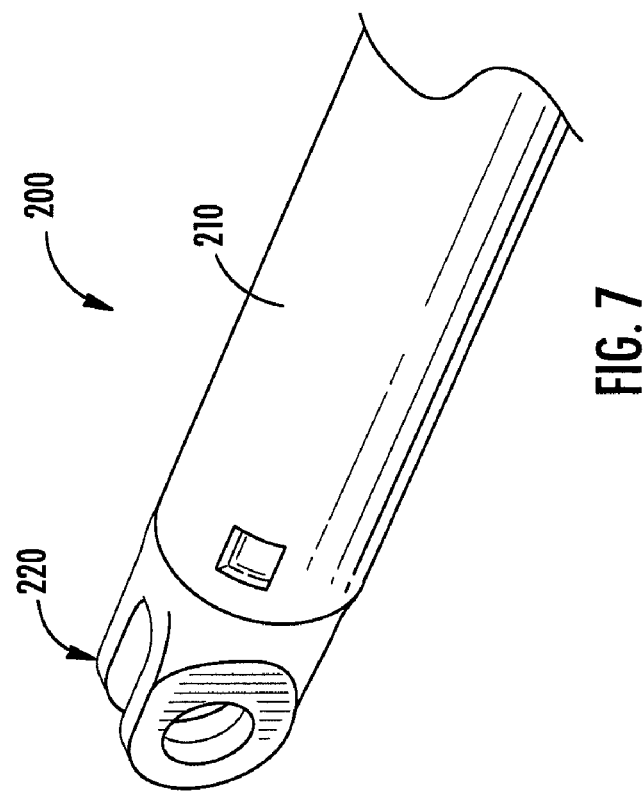
Figure 8A:
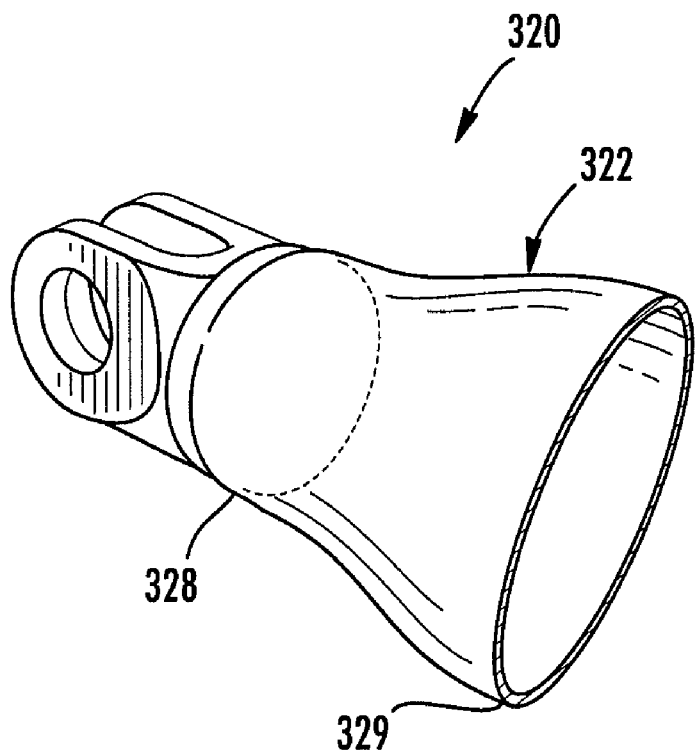
Figure 8B:
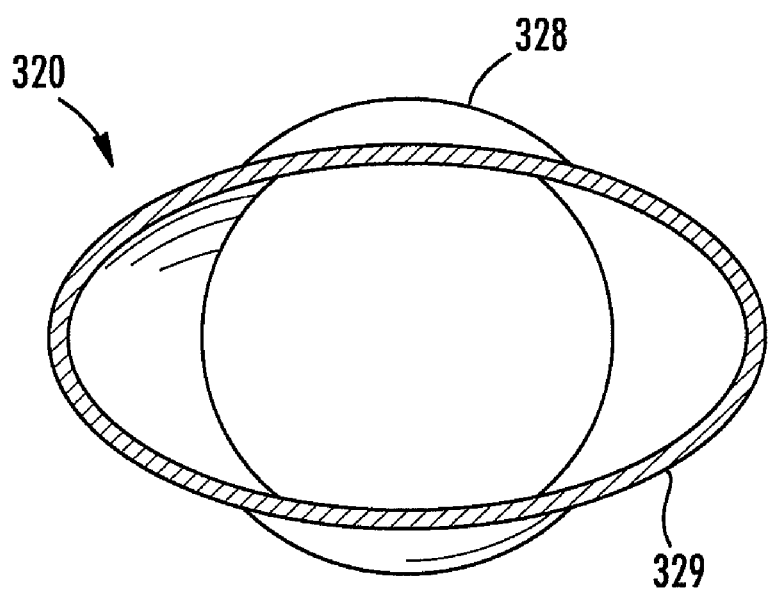

Having thus described the invention in general terms, reference will now be made to the accompanying drawings, which are not necessarily drawn to scale, and wherein:

FIG. 1 is a perspective view of a composite structural member constructed in accordance with an embodiment of the present invention;

FIG. 2 is a cross-sectional view of the structural member of FIG. 1, taken along line 2-2 of FIG. 1;

FIG. 3 is a perspective view of one end of the structural member of FIG. 1 in which the sleeve is shown separated from the member to reveal the split ferrule;

FIG. 4 is an exploded perspective view of the structural member of FIG. 1;

FIGS. 5a-d are perspective views, at various sequential stages of assembly according to an embodiment of the present invention, of the composite structural member of FIG. 1;

FIG. 6 is a perspective view of a fitting for a composite structural member constructed in accordance with another embodiment of the present invention, the fitting including a depression;

FIG. 7 is a perspective view of a composite structural member incorporating the fitting of FIG. 6;

FIGS. 8a and 8b are perspective and side elevational views, respectively, of an end fitting constructed in accordance with another embodiment of the present invention; and FIG. 9 is a cross-sectional view of a composite structural member constructed in accordance with yet another embodiment of the present invention, in which a core is disposed in the lumen of the shaft.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, therein is shown a composite structural member 100 constructed in accordance with an embodiment of the present invention. The composite structural member 100 includes a tubular shaft 110 coupled to an end fittings 120. The end fittings are configured to accept a pin, although many other types of end fittings would also be compatible with the present invention. Sleeves 140 are substantially concentric with and surround parts of shaft 110 and end fittings 120, as described further below. Although the shaft, end fittings, and sleeve are all shown to be cylindrical, these components could have other cross sectional shapes.

Referring to FIGS. 2-4, fitting 120 includes a coupling region 122 that extends into a lumen 112 defined by shaft 110. Coupling region 122 defines a recessed portion in the form of a neck 124, and shaft 110 includes a mating region 114 with a profile similar to that of neck 124. As mentioned, the neck 124 may be circular in cross section, this shape possibly facilitating the manufacturing process, or the neck 124 may be some other shape, such as a polygonal shape, that aids in discouraging relative rotation of the assembled shaft 110 and fitting 120. Mating region 114 is in close radial proximity to coupling region 122 such that mating region 114 mates with coupling region 122, this mating serving to mechanically restrain relative movement of shaft 110 and fitting 120. Specifically, mechanical interference between shaft 110 and fitting 120 discourage relative movement along an axis a defined by shaft 110. In some embodiments, adhesive is disposed between shaft 110 and fitting 120. This adherence serves to further discourage relative movement along the axis defined by the shaft 110, and also to discourage or prevent relative rotation of shaft 110 and fitting 120.

A reinforcing member, such as split ferrule 130, extends partially around, and proximately surrounds, the mating region 114, such that the split ferrule 130 sits in the recessed area defined by neck 124. In this way, the split ferrule 130 inhibits radial expansion of the mating region 114 of shaft 110 upon loading of the composite structural member 100. Such a radial expansion could lead to separation of shaft 110 and fitting 120. The sleeve 140 proximately surrounds split ferrule 130, further discouraging separation of shaft 110 and fitting 120. In one embodiment, sleeve 140 is compressed around shaft 110, thereby increasing the amount of contact between sleeve 140 and shaft 110 as well as enhancing the mechanical coupling of those two components. In another embodiment, adhesive is disposed between shaft 110 and sleeve 140 in order to secure sleeve 140. In yet another embodiment, the coupling between shaft 110 and fitting 120 may be sufficiently strong relative to the loading conditions of the member 100 to obviate altogether the need for a split ferrule and sleeve.

Referring to FIGS. 5a-5d, therein is shown one method for producing the composite structural member 100 (FIG. 1). A fitting 120 is provided, the fitting having a coupling region 122 with an outer surface 123 that defines a neck 124 in the manner discussed previously. The fitting is typically metallic, such as of aluminum, but may be formed of other materials including combinations of materials. A mandrel 150 is extended through an opening in fitting 120, and one or more sheets 116 of uncured polymer-based material, or possibly dry fibers for resin injection, are laid up around fitting 120 and mandrel 150 to form shaft 110. Sheet 116 is configured such that it overlaps with neck 124 as it is being laid up around fitting 120. During lay up, fitting 120 and mandrel 150 provide support for sheet 116, which is typically quite flexible due to small thickness and the fact that the sheet 116 is uncured. Consequentially, shaft 110 formed of sheet 116 generally assumes a shape defined by the outer surfaces of fitting 120 and mandrel 150. Specifically, shaft 110 includes a mating region 114 that closely follows the contour of neck 124. Once sheet 116 is laid up to form shaft 110, sheet 116 is cured to increase rigidity of the shaft 110 and to cause shaft 110 to adhere to fitting 120. After cure, a mating region 114 of shaft 110 is radially adjacent to the coupling region 122 of the fitting 120 and mating with the neck 124.

Once shaft 110 has been formed around fitting 120, a split ferrule 130 may be placed onto the mating region 114 of shaft 110. Split ferrule 130 partially and proximately surrounds the mating region 114 of shaft 110, sitting in the recess defined by neck 124. As such, radial expansion or deformation of shaft 110 is largely prevented, as is any consequential axial separation of shaft 110 and fitting 120. Split ferrule 130 may have a thickness that varies somewhat with the depth of the neck. In combination with the portion of the shaft disposed within the recess, the split ferrule effectively fills the recess so that an outer surface of the ferrule is substantially flush with the shaft 110. As such, inner surface of the split ferrule generally has a complimentary profile and, in one embodiment, an identical, albeit more shallow, profile, as the neck.

The extent to which split ferrule 130 surrounds mating region 114 can be any amount sufficient to inhibit radial expansion of the mating region, including up to and beyond 360 degrees. In cases where the split ferrule extends 360 degrees or more around the mating region, the split ferrule would not form a continuous annular structure, but rather would be split such that the split ferrule can be widened for placement around the mating region. Split ferrule 130 may be formed of a range of materials, including a metal, such as aluminum, or a composite material, such as a fiberglass reinforced epoxy. In some embodiments, several split ferrules may be employed. For example, two split ferrules may be placed around the mating region, each extending, say, 180 degrees around the mating region. Other numbers of split ferrules can also be used. In some cases, distributing split ferrules completely around the mating region may have manufacturing and/or structural integrity advantages.

A tubular sleeve 140 is provided, and the assembly of shaft 110 and fitting 120 are inserted through a lumen 142 defined by sleeve 140. Sleeve 140 can be applied from the shaft side, as shown, or from the fitting side of the member. The applied sleeve 140 is substantially concentric with shaft 110 and, due to the shape of the split ferrule 130, sleeve 140 is radially adjacent to split ferrule 130. This further serves to prevent radial expansion or deformation of shaft 110. Sleeve 140 may be formed of a range of materials, including metals and/or composites. Fitting may include a shoulder 126 (FIG. 2) for impeding the sleeve 140 as it slides onto shaft 110. This provides a physical manner of accurately locating the position of the sleeve 140 relative to the shaft 110. A section of reduced width 144 (FIG. 2) can be included in sleeve 140 to assure proper contacting of sleeve 140 and shoulder 126. Finally, sleeve 140 is press fit around fitting 120 and/or shaft 110; this can be at one or several discrete locations, or by compressing of the entire sleeve 140. Adhesive may be applied to one or both of sleeve 140 and split ferrule 130 to enhance the bonding between sleeve 140 and the other components and/or to secure sleeve 140 in place. The application of adhesive is facilitated by the use of a tapered sleeve and coupling region of fitting, this geometry allowing the parts to gradually engage as the shaft is inserted through the sleeve. In cases where the sleeve and coupling region of the fitting are tapered, use of a shoulder on the fitting allows the bond line between the sleeve and shaft/split ferrule to be easily and reliably established.

Referring to FIGS. 6 and 7, in another embodiment of the present invention, a composite structural member 200 includes a shaft 210 and a fitting 220, the fitting defining a depression 224. Depression 224 does not extend completely around the circumference of fitting 220, that is, the depression 224 is not radially symmetric so as to form a neck. Using the processes described above, the shaft 210 can be formed around fitting 220 such that the shaft 210 assumes the profile of the fitting 220. Because the depression 224 is not radially symmetric, the mechanical interference its presence causes between shaft 210 and fitting 220 inhibits both relative translation of the shaft 210 and fitting 220 as well as relative rotation. Along the lines of the embodiment illustrated in FIGS. 6 and 7, it should be noted that the recessed portions in all of the examples could also be protrusions that act to similarly induce mechanical interference with the fitting and associated shaft.

Referring to FIGS. 8a and 8b, therein is shown a fitting 320 constructed in accordance with another embodiment of the present invention. Fitting 320 has a coupling region 322 for mating with a shaft (not shown) in a manner similar to that discussed previously. The coupling region 322 includes a portion 328 of circular cross section and a radially asymmetric portion 329, in this case of elliptical cross section. When a shaft is bonded to the coupling region 322, the radial asymmetry of the elliptical portion 329 discourages relative rotation of the shaft and fitting. In some embodiments, such as the illustrated embodiment, the major axis of the ellipse defined by the elliptical portion 329 is greater than the diameter of the circular portion 328. For such a configuration, the fitting 320 and an associated shaft would also be at least partially inhibited from relative axial movement. Other cross-sectional geometries are also possible for the asymmetrical portion 329, such as polygonal and/or periodic curves (i.e., harmonics). In some embodiments, the fitting may be completely asymmetrical such that there is no portion 328 of radial symmetry. Also, it is not necessary that the fitting include areas of greater and smaller width in order to prevent axial relative movement. Such relative movement can be inhibited by including an adhesive between the fitting and the shaft, or such movement can be precluded by the loading conditions under which the assembly is utilized.

Many modifications and other embodiments of the invention will come to mind to one skilled in the art to which this invention pertains having the benefit of the teachings presented in the foregoing descriptions and the associated drawings. For example, referring to FIG. 9, in one embodiment of the process for creating a composite structural member 400, a core structure 460 is coupled with the fitting in the general area where the shaft will later be formed. The core structure acts as a template, along with the fitting, around which the shaft is formed. In this way, the core 460 permanently forms part of the composite member 400, being disposed in the lumen 412 formed by the shaft 410. Core material, for example, can be a polymeric structural foam, such that its crush strength is sufficient to support the shaft during processing and/or use, while the weight added by the presence of the core is minimal.

The present invention also contemplates embodiments in which the fitting is not an end fitting, but rather is more centrally located in the shaft. Also, while a split ferrule was used to exemplify the reinforcing member in the above description, the reinforcing member can be any structure that acts to constrain axial expansion of the shaft. Further, when used in conjunction with the sleeve, reinforcing member can be any structure that couples the outer surface of the shaft in the area of the neck with the inner surface of the sleeve, such that the reinforcing member creates a mechanical stop for radial expansion of the shaft. Other processes are also available for forming the shaft, such as resin transfer molding and the use of dry fiber pre-forms.

Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A composite structural member comprising:
    a fitting including a coupling region, the coupling region defining at least one recessed portion bounded by one or more non-recessed portions;
    a tubular shaft having a mating region and defining a lumen, said fitting being disposed in the lumen such that the mating region mates with the coupling region of said fitting;
    at least one reinforcing member that partially and proximately surrounds the mating region of said shaft, said at least one reinforcing member being substantially c-shaped, and
    a sleeve coupled to said shaft for discouraging separation of said reinforcing member and the mating region of said shaft,
    wherein said shaft and fitting are mechanically restrained from at least some relative movement due to interference of said shaft and said fitting, and
    wherein the recessed portion extends circumferentially around said fitting to form a neck.

2. A structural member according to claim 1, further comprising adhesive disposed between the coupling region of said fitting and the mating region of said shaft.

3. A structural member according to claim 1, wherein said sleeve is substantially concentric with said shaft and proximately surrounds at least part of said reinforcing member and shaft.

4. A structural member according to claim 3, wherein said shaft, fitting, reinforcing member, and sleeve are tapered.

5. A structural member according to claim 4, further comprising adhesive disposed between said reinforcing member and sleeve.

6. A structural member according to claim 1, wherein said sleeve is compressed around at least one of said shaft and said fitting.

7. A structural member according to claim 1, further comprising a core disposed in at least part of the lumen of said shaft for supporting at least part of said shaft.

8. A structural member according to claim 1, wherein said at least one reinforcing member includes a split ferrule.

9. A structural member according to claim 1, wherein said at least one reinforcing member extends approximately 180 degrees around the mating region of said shaft.

10. A composite structural member comprising:
- a fitting having a coupling region with an outer surface, the outer surface defining at least one recessed portion bounded by one or more non-recessed portions;
- a tubular shaft having a mating region that is radially adjacent to the coupling region, the mating region defining a recess that mates with the recessed portion of the outer surface;
- at least one reinforcing member that partially and proximately surrounds the mating region of said shaft, said at least one reinforcing member being substantially c-shaped; and
- a tubular sleeve substantially concentric with said shaft and radially adjacent to said reinforcing member, and
- wherein the recessed portion extends circumferentially around said fitting to form a neck, and
- wherein said shaft and fitting are mechanically restrained from at least some relative movement and said sleeve discourages separation of said reinforcing member and the mating region of said shaft.

11. A structural member according to claim 10, wherein said sleeve is compressed around said shaft.

12. A composite structural member according to claim 10, wherein said at least one reinforcing member includes a split ferrule.

13. A composite structural member according to claim 10, wherein said at least one reinforcing member extends approximately 180 degrees around the mating region of said shaft.

14. A composite structural member comprising:
- a fitting including a radially asymmetrical coupling region that defines a recessed portion bounded by one or more non-recessed portions, the recessed portion extending circumferentially around said fitting to form a neck;
- a tubular shaft having a mating region and defining a lumen, said fitting being disposed in the lumen such that the mating region mates with the coupling region of said fitting;
- at least one reinforcing member that partially and proximately surrounds the mating region of said shaft, said at least one reinforcing member being substantially c-shaped; and
- A sleeve coupled to said shaft for discouraging separation of said reinforcing member and the mating region of said shaft,
- wherein said shaft and fitting are mechanically restrained from at least some relative movement due to interference of said shaft and said fitting.

15. A structural member according to claim 14, wherein the coupling region defines a protrusion.

16. A structural member according to claim 15, wherein the protrusion causes the asymmetry of the coupling region.

17. A structural member according to claim 14, wherein the recessed portion bounded by one or more non-recessed portions causes the asymmetry of the coupling region.

18. A composite structural member according to claim 14, wherein said at least one reinforcing member includes a split ferrule.

19. A composite structural member according to claim 14, wherein said at least one reinforcing member extends approximately 180 degrees around the mating region of said shaft.

* * * * *